US007353445B1

(12) United States Patent
Barreh et al.

(10) Patent No.: US 7,353,445 B1
(45) Date of Patent: Apr. 1, 2008

(54) CACHE ERROR HANDLING IN A MULTITHREADED/MULTI-CORE PROCESSOR

(75) Inventors: Jama I. Barreh, Austin, TX (US); Manish K. Shah, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 535 days.

(21) Appl. No.: 11/009,244

(22) Filed: Dec. 10, 2004

(51) Int. Cl.
*H03M 13/00* (2006.01)

(52) U.S. Cl. ............... 714/758; 711/125; 711/126; 711/138

(58) Field of Classification Search ............. 711/138, 711/126, 125
See application file for complete search history.

(56) References Cited

U.S. PATENT DOCUMENTS

| | | | | |
|---|---|---|---|---|
| 5,875,201 | A * | 2/1999 | Bauman et al. | 714/800 |
| 6,014,756 | A * | 1/2000 | Dottling et al. | 714/15 |
| 6,332,181 | B1 * | 12/2001 | Bossen et al. | 711/155 |
| 6,480,975 | B1 * | 11/2002 | Arimilli et al. | 714/52 |
| 6,496,925 | B1 * | 12/2002 | Rodgers et al. | 712/244 |
| 6,681,345 | B1 * | 1/2004 | Storino et al. | 714/42 |
| 6,802,039 | B1 * | 10/2004 | Quach et al. | 714/763 |

OTHER PUBLICATIONS

Alverson et al., "Tera Hardware-Software Cooperation," Tera Computer Company, 1997, (16 pages).
Alverson et al., "The Tera Computer System," Tera Computer Company, 1990, (pp. 1-6).
Alverson et al., "Exploiting Heterogeneous Parallelism on a Multithreaded Multiprocessor," Tera Computer Company, 1992, (pp. 188-197).
Smith et al., "The End of Architecture," 17th Annual Symposium on Computer Architecture, Seattle, Washington, May 29, 1990, (pp. 10-17).
Ungerer et al., "A Survey of Processors with Explicit Multithreading," ACM Computing Surveys, vol. 35, No. 1, Mar. 2003, (pp. 29-63).

* cited by examiner

*Primary Examiner*—Shelly Chase
*Assistant Examiner*—Sam Rizk
(74) *Attorney, Agent, or Firm*—Lawrence J Merkel; Meyertons, Hood, Kivlin, Kowert & Goetzel, P.C.

(57) ABSTRACT

In one embodiment, a processor comprises a cache shared by a plurality of threads in execution by the processor, an error detection unit coupled to the cache, and a fetch control unit. The error detection unit is configured to detect an error in data output by the cache responsive to an access corresponding to a first thread of a plurality of threads. Coupled to receive an indication of the error, the fetch control unit is configured to inhibit fetching for the first thread responsive to the error until the thread is redirected in response to the error and until the error is eliminated from the cache that includes the data.

29 Claims, 7 Drawing Sheets

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

Fig. 3

CACHE ERROR HANDLING IN A MULTITHREADED/MULTI-CORE PROCESSOR

BACKGROUND

1. Field of the Invention

This invention is related to processors and, more particularly, to cache error handling in multithreaded processors.

2. Description of the Related Art

Presently, typical processors are single-threaded. That is, the instructions that are being executed concurrently in the processor all belong to the same thread. Instruction fetching in such processors generally involves fetching instructions from the single thread. In various implementations, branch prediction schemes may be used to control fetching or sequential fetching may be implemented. In either case, fetching may be redirected (if a branch misprediction occurs, or for a taken branch in the sequential fetch implementation, or for an exception, trap, etc. in either case).

Most present processors implement an instruction cache to store instructions for rapid fetching by the processor and a data cache to store data from memory that may be used during instruction execution (e.g. as operands of instructions). The cache may be implemented using on-chip or off-chip random access memory (RAM). Such memory is susceptible to soft errors that may be caused by alpha particle collisions, noise in the system, power supply variations, etc. Additionally, hard errors due to a failure in the memory may occur. Typically, a cache allocates and deallocates storage in contiguous blocks referred to as cache lines. That is, a cache line is the minimum unit of allocation/deallocation of storage space in the cache.

In some cases, caches may implement some form of error detection scheme to protect against errors in the stored data. Typically, the caches may store detection data (e.g. a parity bit, error checking code (ECC) bits, etc.) that may be used in conjunction with the stored data to detect at least some errors.

More recently, multithreaded processors have been proposed. Particularly, in fine grain multithreading, the processor may have two or more threads concurrently in process. Instructions may be issued from any of the threads for execution. Thus, in some cases, instructions from different threads may be in adjacent pipeline stages in the processor. Since multiple threads are being fetched and executed, the handling of errors in cache accesses may be more complex.

SUMMARY

In one embodiment, a processor comprises a cache shared by a plurality of threads in execution by the processor, an error detection unit coupled to the cache, and a fetch control unit. The error detection unit is configured to detect an error in data output by the cache responsive to an access corresponding to a first thread of a plurality of threads. Coupled to receive an indication of the error, the fetch control unit is configured to inhibit fetching for the first thread responsive to the error until the thread is redirected in response to the error and until the error is eliminated from the cache that includes the data.

In another embodiment, a processor comprises a cache configured to output data and a corresponding error detection code from a cache line in response to an access. The access corresponds to a first thread of a plurality of threads that the processor is configured to have concurrently active. The processor further comprises an error detection unit coupled to receive the data and the error detection code. The error detection unit is configured to detect an error in the data responsive to the error detection code. The processor still further comprises a fetch control unit configured to schedule the plurality of threads for fetching. Responsive to the error detection unit detecting the error, the fetch control unit is configured to inhibit scheduling the first thread until receiving an indication to redirect the first thread and receiving an indication that the error has been eliminated from the cache line.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
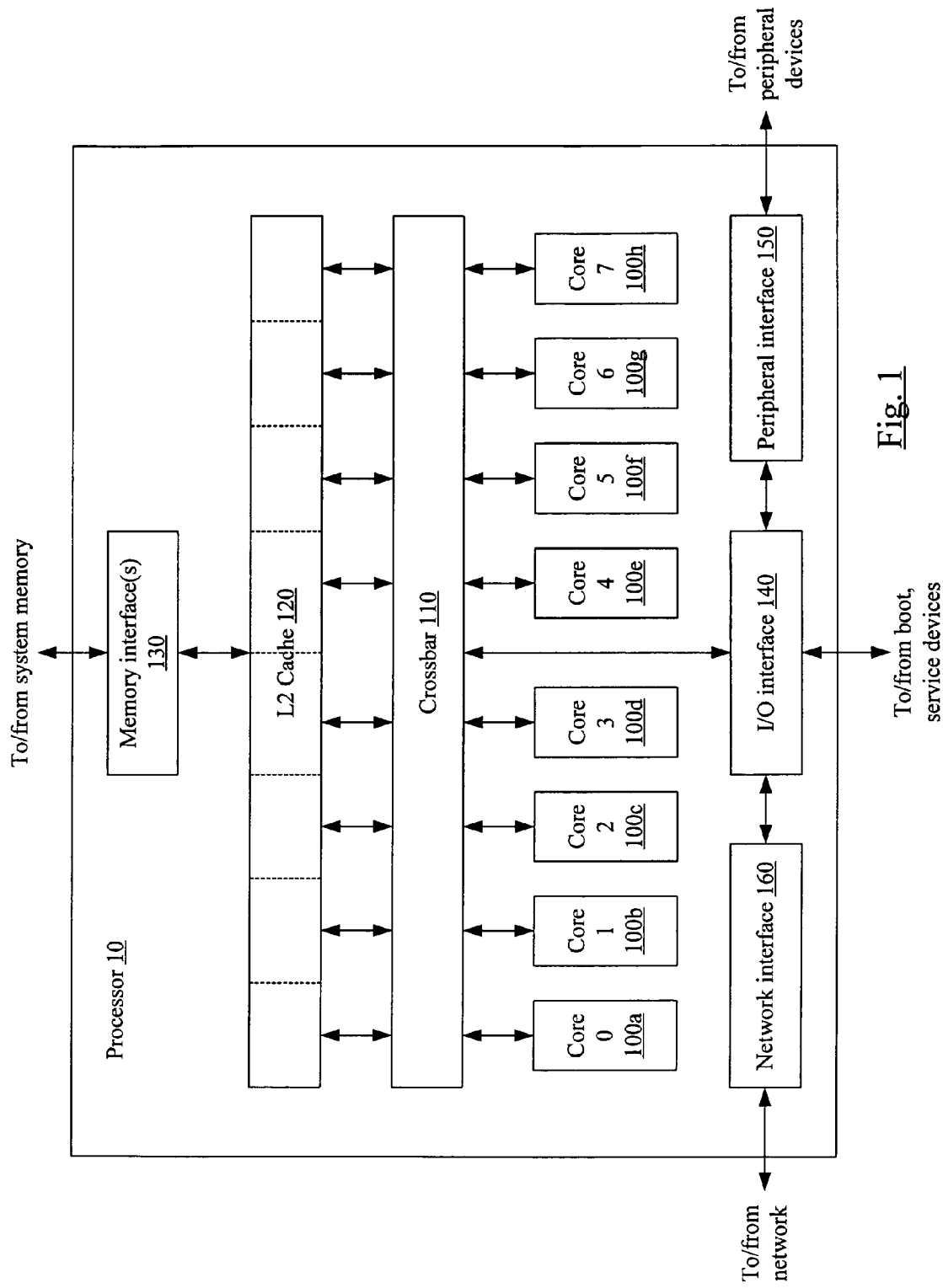
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
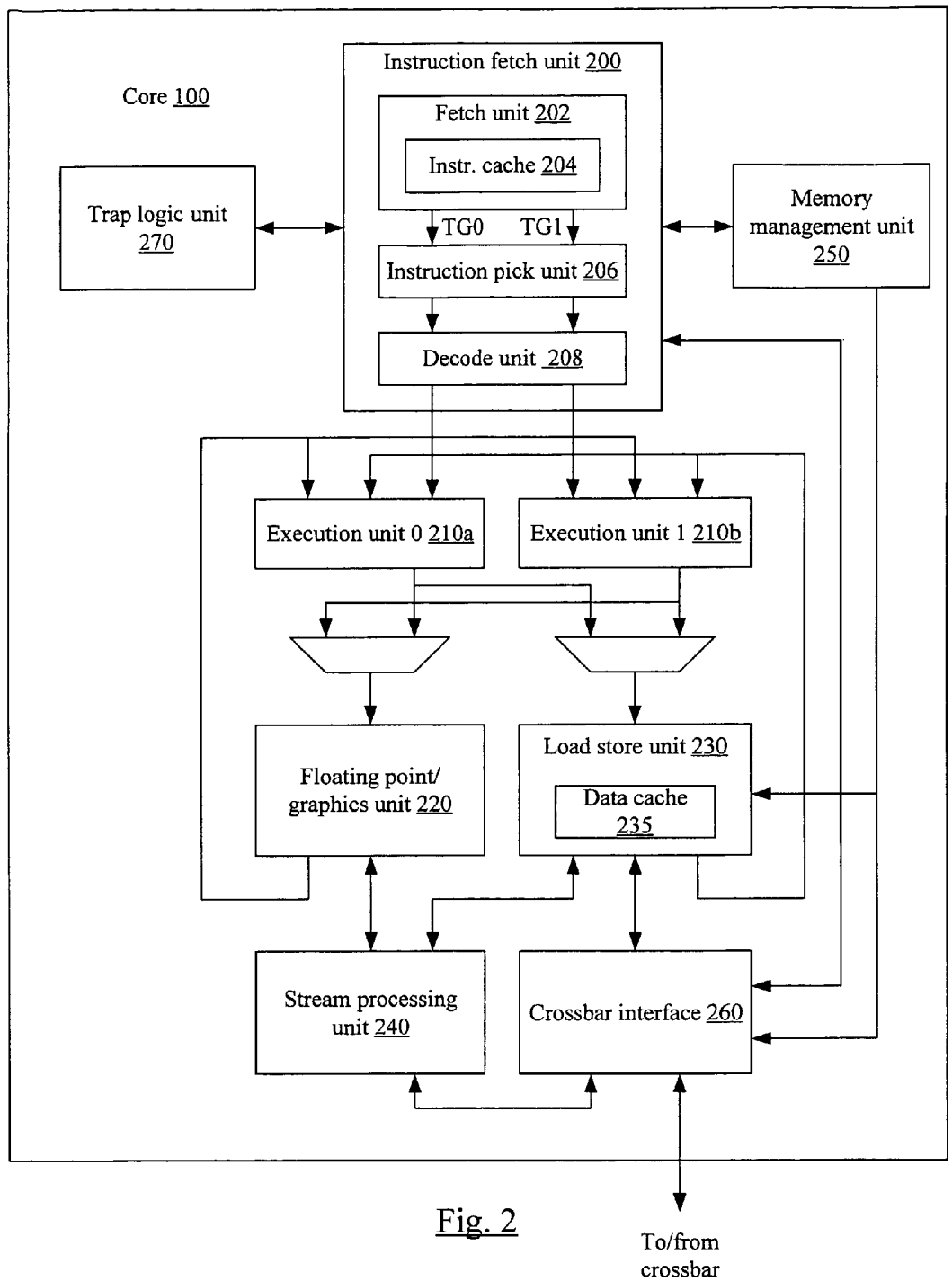
FIG. 2 is a block diagram of one embodiment of a core shown in FIG. 1.

FIGS. 1-3 present an overview of a multithreaded processor 10 that may implement the cache error handling as described in more detail below. In other embodiments, the processor may be implement other multithreaded configurations, as desired.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Cache Error Handling

Figure 4:
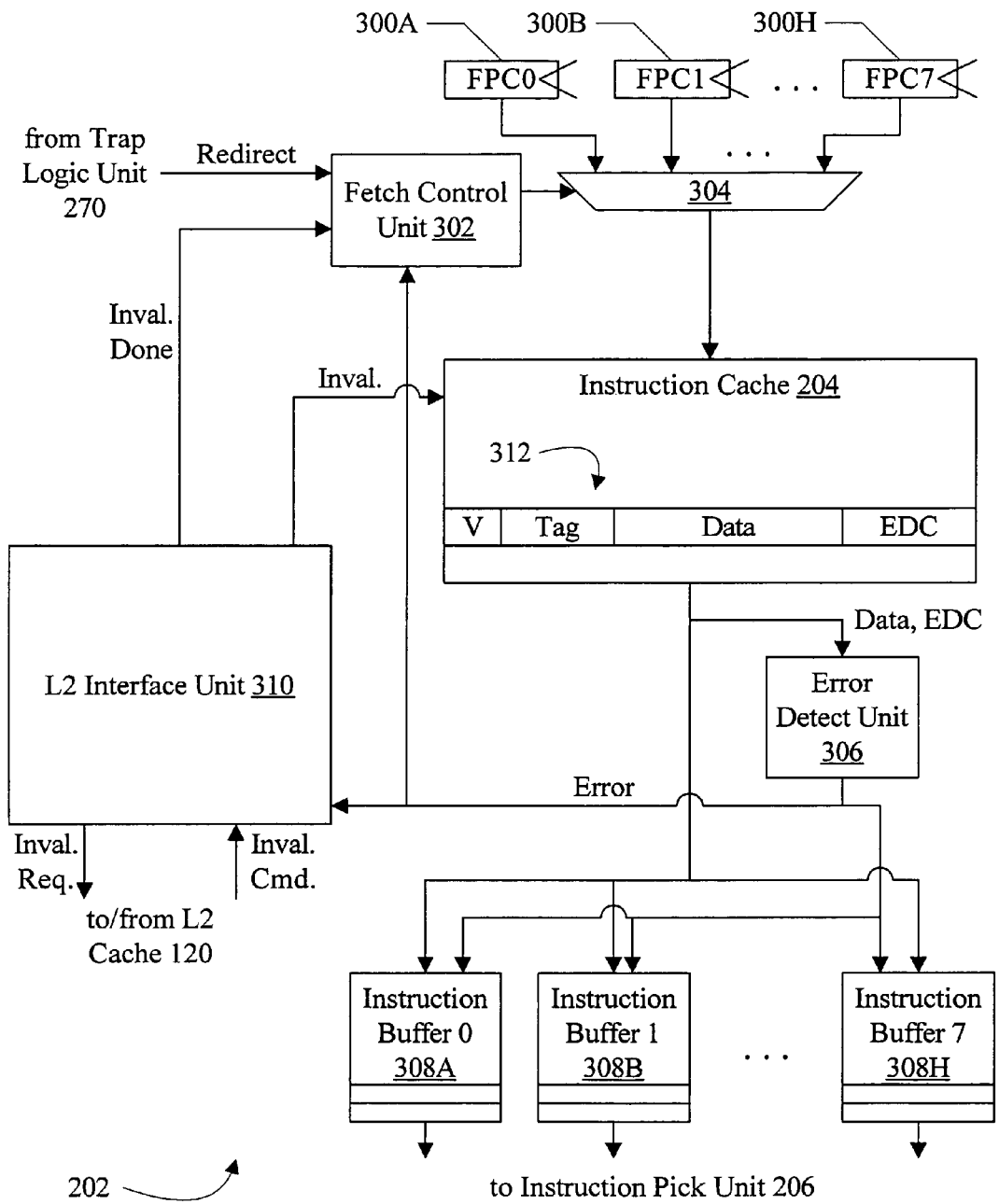
FIG. 4 is a block diagram illustrating one embodiment of a fetch unit shown in FIG. 2.
Figure 5:
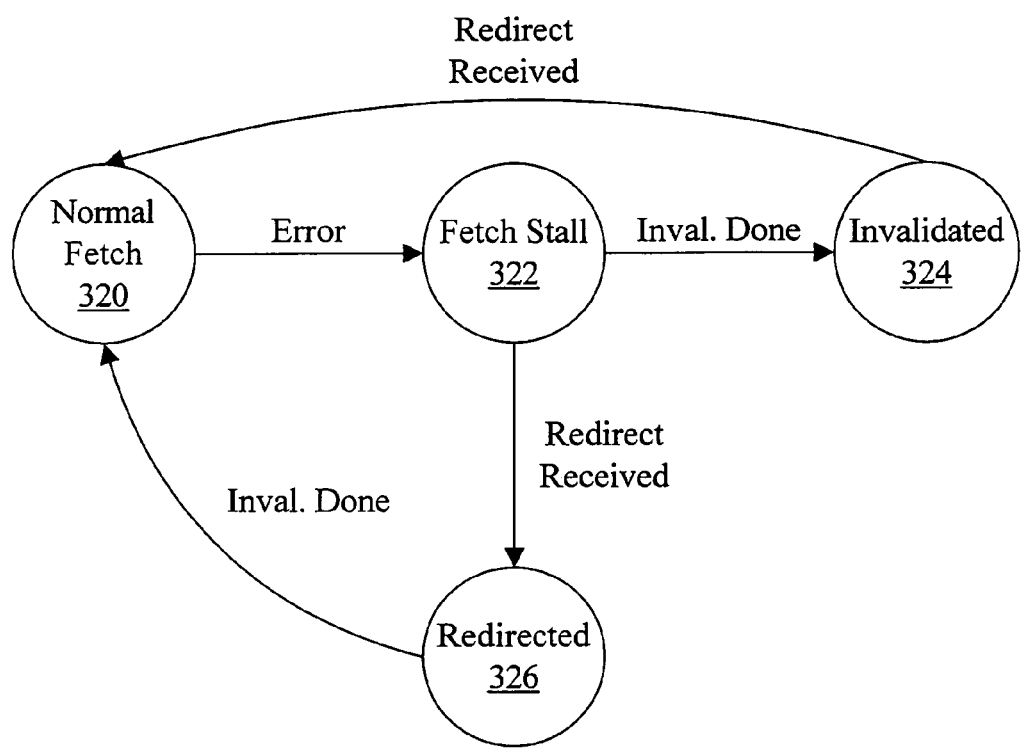
FIG. 5 is a state machine diagram illustrating one embodiment of a state machine that may be implemented in a fetch control unit shown in FIG. 4.
Figure 6:
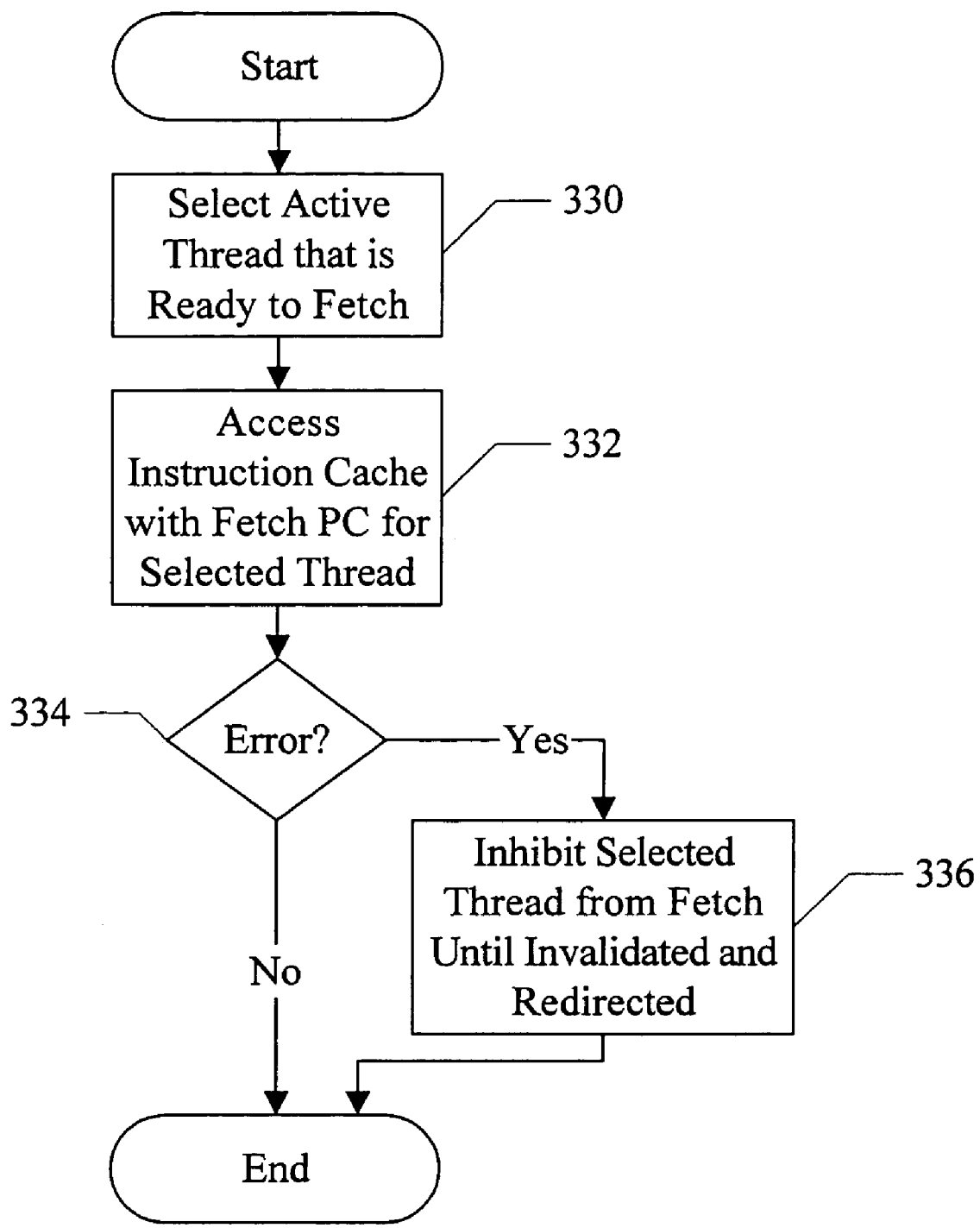
FIG. 6 is a flowchart illustrating one embodiment of operation of a fetch unit.
Figure 7:
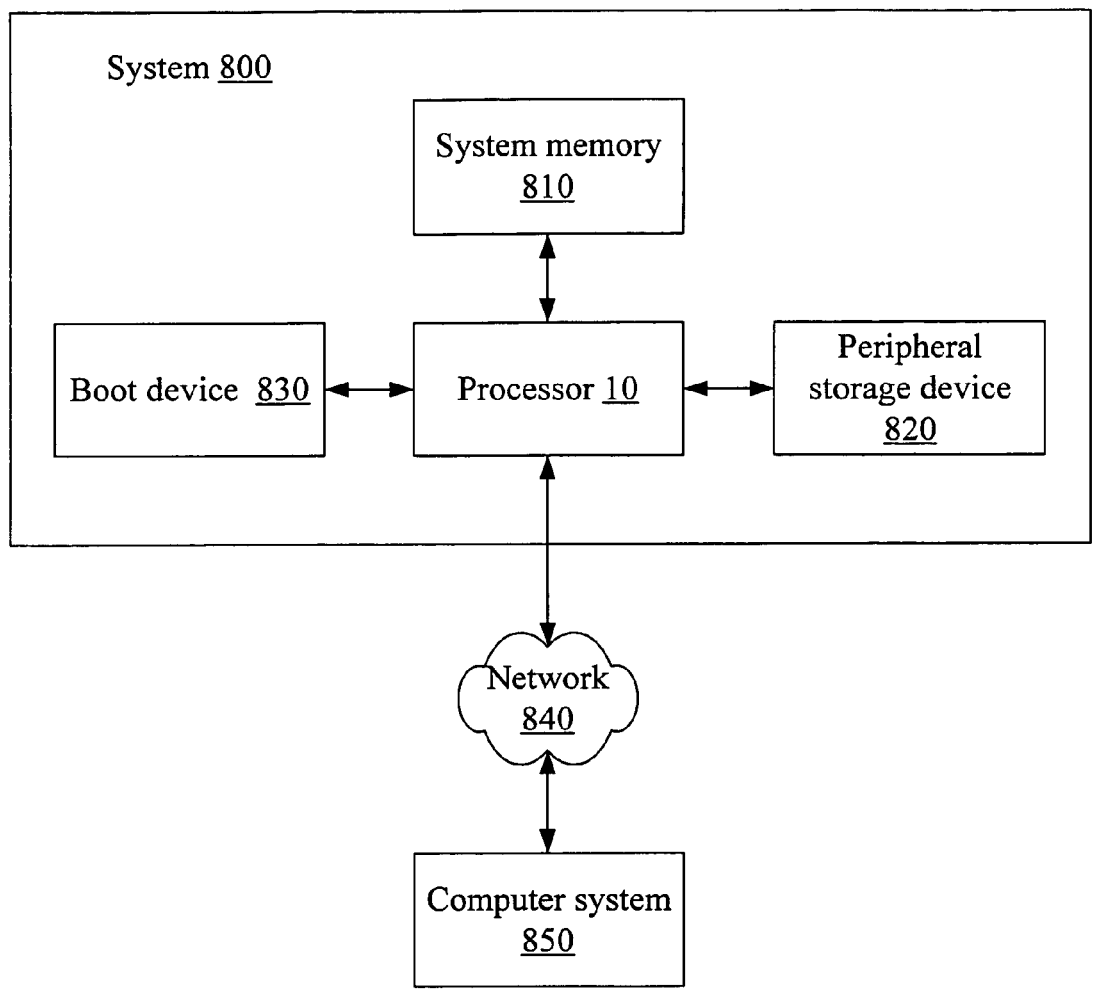
FIG. 7 is a block diagram of one embodiment of a computer system including the processor shown in FIG. 1.

FIGS. 4-6 illustrate one embodiment of the fetch unit 202 and operation thereof for handling errors in instructions fetched from the instruction cache 204. Specifically, the fetch unit 202 may detect an error during a fetch corresponding to a particular thread, and may inhibit fetching for that thread until both the error is eliminated from the cache and a redirect has been received for that thread.

The error may be eliminated from the cache in a variety of fashions, in various embodiments. For example, the cache line containing the error may be invalidated in the instruction cache 204. In other embodiments, if the error detection mechanism also provides for the correction of some errors, the cache line containing the error may be corrected if the error is correctable. In still other embodiments, corrected data corresponding to the cache line may be fetched (e.g. from the L2 cache 120 or the main memory system) and the error may be overwritten in the instruction cache 204 with the correct data. In the discussion below, an embodiment in which the cache line is invalidated will be used as an example. However, any method of eliminating the error from the cache may be used in other embodiments.

In some embodiments, the error handling mechanism may prevent a potential livelock situation that may occur if multiple threads are fetching from the same cache line and that cache line contains an error. The livelock could occur, for example, if processing a fetch for one thread caused the cache line to be brought back into the instruction cache 204 after being invalidated. If the error exists in the L2 cache 120 also, the error may be reintroduced into the cache. By having the threads relatively independent (e.g., inhibiting the fetch of one thread may not inhibit the fetch of another thread) and inhibiting the fetch of a thread for which an error in the cache is detected until the error is eliminated from the cache and until the redirect occurs may prevent the livelock.

In some embodiments, the instruction cache 204 may store an error detection code that may be used to detect errors in the instructions provided by the instruction cache 204. Generally, an error detection code may comprise one or more bits that, in conjunction with the data to which the error detection code corresponds, may be used to detect an error in that data. In some embodiments, the data to which the error detection code corresponds may be a cache line. In other embodiments, the data to which the error detection code corresponds may be a portion of a cache line (i.e. there may be multiple error detection codes per cache line). The error detection code may be calculated over the data to which the error detection code corresponds (e.g. when the data is being written into the cache). In some embodiments, the error detection code may also be used to identify which bit or bits are in error, and thus correction of the error may be possible.

For example, in one embodiment, the error detection code may comprise parity calculated over the data. A parity bit may be supplied, which may indicate whether the total number of binary one bits in the data is odd or even. That is, the parity bit may be calculated as the exclusive OR or exclusive NOR of the data bits. Parity may ensure the detection of a single bit error in the data, and may detect certain multiple bit errors (if they net result of the errors change the total number of binary ones from odd to even or vice versa).

In other embodiments, other error detection codes may be used. For example, various error checking code (ECC) codes may be used. ECC codes are typically multiple bits, each of which is calculated as the exclusive OR of various subsets of the bits in the data. The subsets for each ECC code bit overlap. ECC codes are often defined by the number of bit errors that are detectable using the code and the number of bit errors that are correctable. For example, single bit error correct, double bit error detect (SECDED) codes are often used. Other embodiments may provide for the correction of larger numbers of bit errors and/or detection of larger numbers of bit errors.

Another example of an error detection code that may be used in some embodiments is a cyclical redundancy check (CRC) code. A CRC code may be calculated by dividing the data by a known divisor and storing the remainder as the error detection code. Yet another example of an error detection code that may be used in some embodiments is a checksum, in which the number of binary one bits may be stored as the error detection code. Any type of error detection code, including other error detection codes than those used in the examples above, may be used in various embodiments.

Since the various threads that may be active in the core 100 fetch from the instruction cache 204, the instruction cache 204 may be viewed as shared among the threads. Similarly, the data cache 235 may be shared among the threads as well.

As mentioned above, a thread may comprise a set of instructions that execute independently of the instructions from another thread. In some embodiments, the core 100 may maintain separate state for each thread. For example, the register state for each thread may be separate from other threads. That is, the core 100 may access and update separate register state for each thread.

FIG. 4 illustrates certain components of one embodiment of the fetch unit 202 for implementing instruction cache error handling. Other components may be provided for other operation, as desired. In the illustrated embodiment, the fetch unit 202 includes a plurality of storage devices 300A-300H, each storing a fetch program counter (FPC) corresponding to a different one of the active threads being executed by the core 100. The fetch unit 202 further includes a fetch control unit 302, a multiplexor (mux) 304, the instruction cache 204, an error detect unit 306, a set of instruction buffers 308A-308H, and an L2 interface unit 310 in the illustrated embodiment.

In the illustrated embodiment, the storage devices 300A-300H are coupled to the mux 304, which is further coupled to the instruction cache 206 and to receive selection controls from the fetch control unit 302. The fetch control unit 302 is coupled to receive an invalidate done indication from the L2 interface unit 310. Additionally, the fetch control unit 302 is coupled to receive a redirect indication from the trap logic unit 270 and an error indication from the error detect unit 306. The instruction cache 204 is coupled to provide instructions, in the event of a cache hit, to the instruction buffers 308A-308H. The error detect unit 306 is coupled to receive the data (instructions) fetched from the instruction cache 204 and the error detection code (EDC) corresponding to the data, and is coupled to provide an error indication to the instruction buffers 308A-308H and the L2 interface unit 310 (and the fetch control unit 302, as mentioned above). The instruction buffers 308A-308H are further coupled to the instruction pick unit 206. The L2 interface unit 310 is coupled to provide invalidation control (Inval.) to the instruction cache 204 and to communicate with the L2 cache 120 (e.g. transmitting an invalidation request (Inval. Req.) and receiving an invalidation command (Inval. Cmd.)).

In one embodiment, the instruction cache 204 may be N-way set associative (e.g. 8-way set associative in one implementation). In some embodiments, the number of ways may be greater than or equal to the maximum number of threads that may be active in the core 100. Other embodiments may implement direct mapped configurations or other configurations. The instruction cache 206 may further include an instruction TLB (ITLB), or an ITLB may be accessed in parallel with the instruction cache 206, in embodiments which implement virtual to physical address translation. The instruction cache 206 is further coupled to provide a miss indication to the fetch control unit 302 and the cache miss unit 310.

The operation of the embodiment of FIG. 4 may occur over several pipeline stages (although the number of pipeline stages and the assignment of operations to pipeline stages may vary from embodiment to embodiment). Pipeline storage devices have not been shown in FIG. 4, but may be inserted as desired at appropriate points. In one embodiment, the fetch control unit 302 may select (or schedule) a thread to fetch from the active threads in a "before fetch" (BF) stage, not shown in FIG. 3. While the illustrated embodiment shows the storage devices 300A-300H as sources of a fetch PC, other embodiments may include additional sources to the mux 304 (e.g. redirect PCs from various pipeline stages such as execute and writeback). The selected fetch PC is provided to the instruction cache 204, along with an indication of the selected thread such as a thread tag or thread identifier. The fetch control unit 302 may be further configured to update the various fetch PCs due to a fetch, a redirect of a thread, cache miss, fetch error, etc. (not shown in FIG. 4). As used herein, a PC may be any representation of the address at which an instruction or instructions are stored (e.g. a virtual address, a physical address, a portion of the address, etc.).

During the fetch stage, the instruction cache 204 accesses the instruction cache tags and cache lines responsive to the fetch PC. In one embodiment, the ITLB is also accessed and ITLB hit/miss is determined in the fetch stage as well, although other embodiments may make the hit/miss determination in the cache stage. In the cache stage, the instruction cache 204 determines instruction cache hit/miss for the fetch, and selects the hitting cache line for output to the instruction buffers 308A-308H if a hit is detected. For example, in some embodiments, the instruction cache 204 is physically tagged (that is, the instruction cache tags are physical addresses of the instruction cache lines) and the instruction cache 204 may compare the physical address from the ITLB with the tags to detect a hit/miss. In other embodiments, the instruction cache 204 may be virtually tagged (that is, the instruction cache tags are virtual addresses of the instruction cache lines) and the instruction cache 204 may compare the fetch PC with the tags to detect hit/miss. In a cache hit case, the instructions from the instruction cache may be stored in the instruction buffer 308A-308H corresponding to the thread that was fetched.

An exemplary entry 312 in the instruction cache 204 is shown in FIG. 4. There may be a similar entry to the entry 312 for each cache line in the instruction cache 204. In the illustrated embodiment, the entry 312 includes a valid bit (V), a tag (Tag), cache line data (Data), and an error detection code (EDC). The valid bit may indicate whether or not the cache line is valid (e.g. valid when set, invalid when clear, or vice versa). The tag may be the address of the cache line in memory (e.g. a physical address or virtual address, in various embodiments). The data may comprise the cache line of data from the memory locations indicated by the tag. Generally, as used herein, the term "data" when used with respect to a cache may be used generically to refer to instructions, data to be operated upon during instruction execution, or a combination thereof. Since the data in this embodiment is in the instruction cache 204, the data may be interpreted as instructions when fetched from the instruction cache 204. The EDC may comprise one or more error detection codes that correspond to the data.

If a cache hit is detected, the cache line data (or portion of a cache line, if a portion is read from the cache for a given access) and the corresponding error detection code is provided to the error detect unit 306. The error detect unit 306 may process the data and the error detection code (according to the definition of the error detection code) to determine if an error is detected, and may signal the occurrence or lack of error via the error indication. For example, if parity is implemented, the parity bit may be exclusive OR'd with the data bits. An error may be detected if the result is a binary one. If ECC is used, each ECC bit may be exclusive OR'd with the corresponding subset of bits from the data, and an error may be detected if at least one binary one results. Other EDCs may be processed in other fashions, according to their respective definitions.

The error indication may include, e.g., a signal that may be asserted to indicate error and deasserted to indicate no error. The error signal may be provided to the instruction buffers 308A-308H, which may associate the error with the instructions written to the instruction buffer 308A-308H that corresponds to the thread that was fetched to detect the error. The error may be pipelined with the corresponding instructions to the trap logic unit 270, which may respond to the error by redirecting the thread to an error handling routine using the redirect indication to the fetch control unit 302. Alternatively, the error indication may be provided to the trap logic unit 270 directly, rather than pipelining the error with the instructions. The redirect indication from the trap logic unit 270 may identify which thread is being redirected (e.g. with a thread identifier) and may provide the PC to which fetching is to be redirected. In some embodiments, the redirect may be to an error handling software routine that is to handle the detected error. In other embodiments, if the error detection code supports correction of the detected error, the redirect may simply cause a refetch of the PC for which the error was detected. Elimination of the error in the cache may include correcting the error, in such embodiments.

The error indication may also identify the thread for which the error was detected, in some embodiments. In other embodiments, the fetch control unit 302 may track which threads have been selected for fetching and may thus be aware of which thread is associated with the detected error. The fetch control unit 302 may identify the thread to the L2 interface unit 320 in such embodiments. The L2 interface unit 310 may also receive the address associated with the errant fetch. For example, the instruction cache 204 may provide the address (from the ITLB) for embodiments in which translation is used. If translation is not used, the address may be provided from the output of the mux 304.

In response to the error indication from the error detect unit 306, the fetch control unit 302 may inhibit the corresponding thread from additional fetching. The fetch control unit 302 may inhibit the thread from fetching until both a redirect is received for the thread from the trap logic unit 270 (via the redirect indication) and the invalidation of the errant cache line has occurred (indicated by the invalidation done indication from the L2 interface unit 310, in this embodiment). In other embodiments, the invalidation may be replaced by other methods of eliminating the error in the cache, as described previously. The invalidation done indication may include an identification of the thread for which the invalidation done indication is being provided, to permit the fetch control unit 302 to associate the indication with the correct thread.

In response to the error indication from the error detect unit 306, the L2 interface unit 310 may communicate with the L2 cache 120 to invalidate the errant cache line (or otherwise correct the error, in other embodiments). Particularly, in the illustrated embodiment, the L2 interface unit 310 may transmit an invalidation request to invalidate the cache line. The L2 cache 120 may process the request and return an invalidation command to the L2 interface unit 310. Responsive to the invalidation command, the L2 interface unit 310 may invalidate at least the corresponding cache line in the instruction cache 204, e.g. using the invalidation control in FIG. 4. Additionally, the L2 interface unit 310 may signal the completion of the invalidation to the fetch control unit 302 using the invalidation done indication.

In one embodiment, the L2 interface unit 310 may communicate with the L2 cache 120 prior to invalidation of the cache line in the instruction cache 204 to maintain coherency between the L2 cache 120 and the instruction cache 204. For example, the L2 cache 120 may be inclusive of the cache lines in the instruction cache 204 (and the data cache 235). In other embodiments, communication with the L2 cache 120 may be performed for other reasons (e.g. to check if the L2 cache 120 also has an error in the cache line).

The L2 cache 120 may process the invalidation request in a variety of fashions, in various embodiments. For example, the L2 cache 120 may simply invalidate the cache line in the L2 cache 120 responsive to the invalidation request. Alternatively, the L2 cache 120 may check the cache line in the L2 cache 120 for error. If an error is detected, the L2 cache 120 may invalidate the cache line. If an error is not detected, the L2 cache 120 may not invalidate the cache line. In still other embodiments, if an error is detected, the L2 cache 120 may initiate a fetch of the cache line from the memory system for storage in the L2 cache 120.

In various embodiments, invalidation of the cache line in the instruction cache 204 may be implemented in different fashions. For example, in some embodiments, the instruction cache 204 may comprise a separate memory array for the valid bits of the cache lines (along with separate memory arrays for the tags, data, and error detection codes, respectively, or any combination of the above may be included in the same memory array). The valid bit memory array may be dual ported for access responsive to the output of mux 304 and responsive to the invalidation control. In one embodiment, the invalidation control may identify the set to be invalidated and the valid bit memory array may clear all valid bits in the set. In other embodiments, the specific entry 312 to be invalidated may be identified via the invalidation control, and the valid bit memory array may clear the identified valid bit. In other embodiments, separate memory arrays for the valid bit and other entry values may not be used. The memory array may be dual ported to permit update using the invalidation control. In still other embodiments, the memory arrays may not be dual ported and the mux 304 may include an input for the invalidation control to access the instruction cache 204 to perform the invalidation.

If a cache miss is detected, a cache fill may be initiated to store the missing cache line into the instruction cache 204. The error detection code(s) for the cache line may be calculated and stored as well (or may be provided with the cache fill from the L2 cache 120). Any cache fill mechanism may be used.

As mentioned above, a thread may be redirected in response to detecting an error during a fetch for the thread.

Generally, a thread may be referred to as "redirected" if instruction fetching is caused to begin at a different address. In the case of an error, the address to which fetching is redirected may be the address of an error handling routine. Alternatively, in embodiments in which the eliminating the error includes correcting the error, the redirect may simply cause fetching to restart at the fetch PC for which the error was detected. Other redirects may occur for other reasons. For example, exceptions, traps, or interrupts experienced when executing an instruction may cause the thread to be redirected to an exception, trap, or interrupt handler. Control transfer instructions that are mispredicted (or, in the present embodiment, taken control transfer instructions) may cause fetching to be redirected to the correct address (target or sequential) of the control transfer instruction. The fetch control unit 302 may begin fetching the thread at the redirect address in response to a redirect.

It is noted that, in the present embodiment, each of the instruction buffers 308A-308H corresponds to a different thread of the plurality of threads that the core 100 may have concurrently in process. Each instruction buffer 308A-308H may include at least one entry, and may have multiple entries. Any number of entries may be provided (e.g. 8 entries, in some embodiments). The instruction buffers 308A-308H may have any construction. However, in one implementation, each instruction buffer 308A-308H may comprise a single register storing entry 0 of the buffer (the oldest instruction in the buffer) and a memory array storing the remaining entries (with pointers indicating the oldest and youngest instructions in the memory array). As instructions are successfully issued for execution, the next instruction in program order may be read from the memory array and shifted into the register.

In the present embodiment, the instruction buffers feed the instruction pick unit 206, which schedules instructions for execution (e.g. according to thread group, as discussed above). Other embodiments may have other constructions. For example, each instruction buffer may feed dedicated resources for the thread (e.g. execution resources may be dedicated to each thread).

While mux 304 is illustrated in FIG. 4, any selection devices may be used as desired, including parallel or cascaded sets of muxes. Additionally, storage devices 300A-300H (and other storage devices described herein) may comprise any sort of storage device (e.g. latches, flops, registers, etc.).

While the illustrated embodiment describes handling of cache errors in the instruction cache 204, a similar mechanism may be used to handle cache errors in the data cache 235 (e.g. inhibiting fetch for the corresponding thread until the error is eliminated from the cache and the thread is redirected, etc.). If a thread experiences a data cache error, the thread may be flushed from the pipeline of the core 100, in some embodiments (e.g. to prevent instructions dependent on the result of the cache access for which the error is detected from executing). Other embodiments may permit the instructions in the pipeline to execute, but may not commit the results. Thus, in general, a cache access may be viewed as corresponding to a thread if the cache access is a fetch of instructions included in the thread or if the cache access is an access to data operated upon during execution of the instructions.

Turning next to FIG. 5, a state machine diagram is shown illustrating one embodiment of a state machine that may be implemented by the fetch control unit 302 for controlling whether or not a given thread is ready to fetch. The fetch control unit 302 may implement multiple independent instances of the state machine shown in FIG. 5 (one for each thread). The state machines may be independent of each other. Other state machines may be implemented to control fetch for other reasons, or other states may be implemented in the state machine shown in FIG. 5 for such other reasons, in various embodiments. Generally, if the state machine is in a particular state and none of the conditions that cause a transition out of that state occurs, the state machine remains in the particular state.

In the illustrated embodiment, the state machine includes a normal fetch state 320, a fetch stall state 322, an invalidated state 324, and a redirected state 326. If the state machine is in the normal fetch state 320, the corresponding thread is ready to fetch. That is, the corresponding thread is available to fetch, or to be scheduled for fetch by the fetch control unit 302. In the fetch stall state 322, the invalidated state 324, and the redirected state 326, the corresponding thread is not available for fetching. That is, the fetch control unit 302 may inhibit scheduling the thread if the state machine is not in the normal fetch state 320.

If no error has been detected for the thread, the state machine is in the normal fetch state 320. If the state machine is in the normal fetch state 320 and an instruction cache error is detected for a fetch corresponding to the thread, the state machine transitions to the fetch stall state 322. The state machine may transition from the fetch stall state 322 to one of the invalidated state 324 or the redirected state 326, depending on which occurs first: either the cache line is invalidated in the instruction cache 204 or the redirect is received from the trap logic unit 270. If the cache line is invalidated first (indicated by receiving an invalidation done from the L2 interface unit 310 identifying the corresponding thread), the state machine transitions from the fetch stall state 322 to the invalidated state 324. The state machine transitions from the invalidated state 324 to the normal fetch state 320 in response to receiving the redirect indication for the thread. On the other hand, if the redirect indication is received first, the state machine transitions from the fetch stall state 322 to the redirected state 326. The state machine transitions from the redirected state 326 to the normal fetch state 320 in response to receiving the invalidation done indication.

Turning now to FIG. 6, a flowchart is shown illustrating high level operation of one embodiment of the fetch unit 202 for cache error handling. While the blocks shown in FIG. 6 are illustrated in a particular order for ease of understanding, any order may be used. Furthermore, the blocks may be implemented in parallel in combinatorial logic within the fetch unit 202. Other blocks, portions of blocks, or the flowchart as a whole may be pipelined over multiple clock cycles, in various embodiments.

The fetch unit 202 may select an active thread that is ready to fetch (block 330). For example, in embodiments that implement a state machine similar to FIG. 5 for each thread, an active thread that is ready to fetch may be indicated by the normal fetch state 320 in its state machine. If multiple threads are ready to fetch, the fetch unit 202 may implement a least recently fetched algorithm to select one of the threads. Other embodiments may implement any other arbitration mechanism to select among ready-to-fetch threads.

The fetch unit 202 may access the instruction cache 204 with the fetch PC for the selected thread (block 332). If an error occurs in the fetch (decision block 334, "yes" leg), the fetch unit 202 may inhibit the selected thread from fetching until the cache line containing the error is invalidated and the thread has been redirected (block 336). For example, block 336 may be implemented by transitioning the corresponding state machine to the fetch stall state 322 (and then one of the invalidated state 324 or the redirected state 326 prior to returning to the normal fetch state 320). As mentioned previously, well the present embodiment eliminates the error from the cache by invalidating the cache line, other embodiments may eliminate the error in other fashions.

Exemplary System Embodiment

As described above, in some embodiments processor 10 of FIG. 1 may be configured to interface with a number of external devices. One embodiment of a system including processor 10 is illustrated in FIG. 10. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
   a cache shared by a plurality of threads in execution by the processor;
   an error detection unit coupled to the cache and configured to detect an error in data output by the cache responsive to an access corresponding to a first thread of the plurality of threads; and
   a fetch control unit coupled to receive an indication of the error and configured to inhibit fetching for the first thread responsive to the error until: (i) the first thread is redirected in response to the error, wherein the first thread is redirected to a fetch address at which fetching for the first thread is to be restarted; and (ii) the error is eliminated from the cache that includes the data.

2. The processor as recited in claim 1 wherein the error is eliminated from the cache by invalidating a cache line that includes the error.

3. The processor as recited in claim 2 further comprising an interface unit configured to communicate with a lower level cache, wherein the interface unit is coupled to receive the indication of the error and is configured to request an invalidation from the lower level cache, and wherein the interface unit is configured to receive an invalidation command from the lower level cache responsive to the request and to invalidate the cache line in the cache responsive to the invalidation command.

4. The processor as recited in claim 3 wherein the interface unit is coupled to the fetch control unit to provide an indication that the cache line is invalidated in the cache.

5. The processor as recited in claim 1 wherein the cache is an instruction cache and wherein the data output by the cache includes instructions for execution in the processor.

6. The processor as recited in claim 1 wherein the cache is a data cache.

7. The processor as recited in claim 6 wherein the error detection code comprises parity calculated over the data.

8. The processor as recited in claim 6 wherein the error detection code comprises an error correction code (ECC).

9. The processor as recited in claim 6 wherein the error detection code comprises a cyclical redundancy check (CRC) code.

10. The processor as recited in claim 6 wherein the error detection code comprises a checksum.

11. The processor as recited in claim 1 wherein the cache is configured to output an error detection code used by the error detection unit to detect the error.

12. The processor as recited in claim 1 wherein the error is eliminated from the cache by correcting the error.

13. The processor as recited in claim 1 wherein the error is eliminated from the cache by fetching correct data and overwriting the error in the cache with the correct data.

14. A processor comprising:
   a cache configured to output data and a corresponding error detection code from a cache line in response to an access, the access corresponding to a first thread of a plurality of threads that the processor is configured to have concurrently active;
   an error detection unit coupled to receive the data and the error detection code, wherein the error detection unit is configured to detect an error in the data responsive to the error detection code; and a fetch control unit configured to schedule the plurality of threads for fetching, wherein the fetch control unit is configured to inhibit scheduling the first thread, responsive to the error detection unit detecting the error, until: (i) receiving an indication to redirect the first thread to a fetch address at which fetching for the first thread is to be restarted; and (ii) receiving an indication that the error has been eliminated from the cache line.

15. The processor as recited in claim 14 wherein the error is eliminated by invalidating the cache line in the cache.

16. The processor as recited in claim 15 further comprising an interface unit configured to communicate with a lower level cache, wherein the interface unit is coupled to receive an indication of the error and is configured to request an invalidation from the lower level cache, and wherein the interface unit is configured to receive an invalidation command from the lower level cache responsive to the request and to invalidate the cache line in the cache responsive to the invalidation command, and wherein the interface unit is coupled to the fetch control unit to provide the indication that the cache line is invalidated in the cache.

17. The processor as recited in claim 14 wherein the cache is an instruction cache and wherein the data output by the cache includes instructions for execution in the processor.

18. The processor as recited in claim 14 wherein the cache is a data cache.

19. The processor as recited in claim 14 wherein the error detection code comprises parity calculated over the data.

20. The processor as recited in claim 14 wherein the error detection code comprises an error correction code (ECC).

21. The processor as recited in claim 14 wherein the error detection code comprises a cyclical redundancy check (CRC) code.

22. The processor as recited in claim 14 wherein the error detection code comprises a checksum.

23. A method comprising:

detecting an error in data output from a cache line of a cache, the data output in response to an access corresponding to a first thread of a plurality of threads that are in execution in a processor that includes the cache; and inhibiting fetching for the first thread until: (i) the first thread is redirected responsive to the error, wherein the first thread is redirected to a fetch address at which fetching for the first thread is to be restarted; and (ii) the error is eliminated from the cache.

24. The method as recited in claim 23 wherein the cache is an instruction cache.

25. The method as recited in claim 23 wherein the cache is a data cache.

26. The method as recited in claim 23 wherein the detecting is responsive to an error detection code output from the cache.

27. The method as recited in claim 23 wherein the error is eliminated by invalidating the cache line.

28. The method as recited in claim 23 wherein the error is eliminated by correcting the error in the cache line.

29. The method as recited in claim 23 wherein the error is eliminated by fetching correct data and overwriting the error with the correct data.

* * * * *